(12) United States Patent
Gu et al.

(10) Patent No.: US 6,841,654 B2
(45) Date of Patent: Jan. 11, 2005

(54) POLYMIDE-FREE ALIGNMENT LAYER FOR LCD FABRICATION AND METHOD

(75) Inventors: Dong-Feng Gu, Thousand Oaks, CA (US); Young Chung, Calabasas, CA (US); Len Hale, Newbury Park, CA (US)

(73) Assignee: Rockwell Scientific Licensing, LLC, Thousand Oaks, CA (US)

( * ) Notice: Subject to any disclaimer, the term of this patent is extended or adjusted under 35 U.S.C. 154(b) by 187 days.

(21) Appl. No.: 09/855,921

(22) Filed: May 15, 2001

(65) Prior Publication Data

US 2002/0187283 A1 Dec. 12, 2002

(51) Int. Cl.[7] ............................................. C08G 65/02
(52) U.S. Cl. ........................ 528/393; 428/1.1; 428/1.4; 428/1.6; 430/20; 528/366; 522/141; 522/142; 522/170
(58) Field of Search ...................... 428/413, 1.1, 1.4, 428/1.6; 430/20; 523/123, 127

(56) References Cited

U.S. PATENT DOCUMENTS

| 5,196,953 A | 3/1993 | Yeh et al. ...................... 359/73 |
| 5,504,603 A | 4/1996 | Winker et al. ................. 359/73 |
| 5,557,434 A | 9/1996 | Winker et al. ................. 359/73 |
| 5,589,963 A | 12/1996 | Gunning, III et al. ...... 349/119 |
| 5,612,801 A | 3/1997 | Winker ....................... 349/119 |
| 5,619,352 A | 4/1997 | Koch et al. .................... 349/89 |
| 5,638,197 A | 6/1997 | Gunning, III et al. ........ 349/96 |
| 5,773,178 A | * 6/1998 | Shiota et al. .................. 430/20 |
| 5,891,357 A | * 4/1999 | Akashi et al. .......... 252/299.01 |
| 5,986,734 A | 11/1999 | Winker et al. .............. 349/123 |
| 5,995,184 A | 11/1999 | Chung et al. ............... 349/118 |
| 6,191,836 B1 | 2/2001 | Woo et al. ................... 349/124 |

FOREIGN PATENT DOCUMENTS

EP      0622656      4/1994

OTHER PUBLICATIONS

D.B. Taber, L.G. Hale, B.K. Winker, and W.J. Gunning III, M.C. Skarohlid, J.D. Sampica, and T.A. Seder, *Gray Scale and Contrast Compensator for LCDs Using Obliquely Oriented Anisotropic Network*, Apr. 1998, p. 162–171.

J.P. Eblen, Jr., L.G. Hale, B.K. Winker, D.B. Taber, P. Kobrin, W.J. Gunning III, M.C. Skarohlid, T.A. Seder, J.D. Sampica, P.M. Franzen, *Advanced Gray–Scal Compensator for TN–LCDs for Avionics Applications*, SID 97 Digest, p. 683–686.

* cited by examiner

*Primary Examiner*—David J. Buttner
*Assistant Examiner*—Christopher Keehan
(74) *Attorney, Agent, or Firm*—Koppel, Jacobs, Patrick & Heybl; Michael J. Ram

(57) ABSTRACT

An inexpensive polyimide-free alignment layer comprising a mixture of an epoxy and a reactive liquid crystal material is used for fabricating liquid crystal displays (LCDs). The alignment layer can be cast onto a previously aligned layer, without destroying the alignment of the underlying layer, thus allowing for monolithic fabrication of compensator stacks, without film transfer lamination.

11 Claims, 4 Drawing Sheets

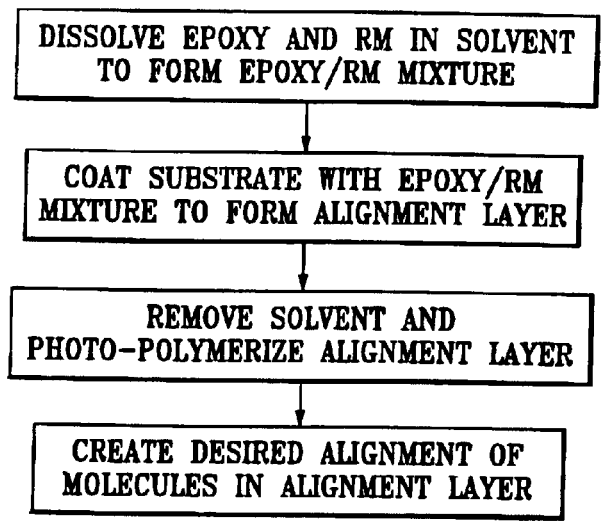
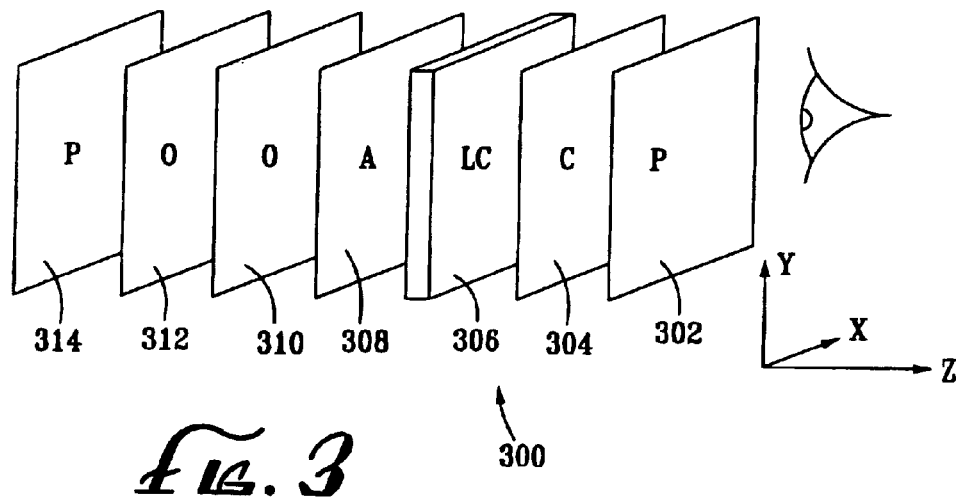

POLYIMIDE-FREE ALIGNMENT LAYER FOR LCD FABRICATION AND METHOD

BACKGROUND OF THE INVENTION

1. Field of the Invention

This invention relates to alignment layers for fabricating liquid crystal displays (LCDs).

2. Description of the Related Art

Liquid crystals are useful for electronic displays because polarized light traveling through a liquid crystal layer is affected by the layer's birefringence, which can be changed by the application of a voltage across the layer. By using this effect, the transmission or reflection of light from an external source, including ambient light, can be controlled with much less power than is required for the luminescent materials used in other types of displays. As a result, liquid crystal display (LCD) devices have become increasingly important in displays which require very low consumption of electrical power or where the environment dictates a lightweight, planar, flat surface. Thus, LCD's are used in display devices such as wristwatches, pocket and personal computers, calculators, aircraft cockpit displays, etc. These applications highlight some of the advantages of LCD technology including very long operational life in combination with very low weight and low power consumption. (For an overview on LCD technology, see U.S. Pat. No. 5,612,801).

In its simplest form, a typical LCD stack comprises a liquid crystal cell, a polarizer and/or an analyzer layer. Additionally the LCD stack often includes compensator films which improve the contrast and viewing angle of the display. The use of such compensators have been disclosed in U.S. Pat. No. 5,196,953 (Yeh et al.), U.S. Pat. No. 5,504,603 (Winker et al.), U.S. Pat. No. 5,557,434 (Winker et al.), U.S. Pat. No. 5,589,963 (Gunning, III et al.), U.S. Pat. No. 5,619,352 (Koch et al.), U.S. Pat. No. 5,612,801 (Winker) and U.S. Pat. No. 5,638,197 (Gunning, III et al.).

Compensators can be placed in a variety of locations between an LCD's polarizer and analyzer layers. With the addition of one or more compensator layers, the contrast ratio is improved over a wide range of viewing angles by careful orientation of the optic axis of the compensator, since the combined retardation effect of the compensator cancels the phase retardation inherent in liquid crystal displays.

FIG. 1 depicts a coordinate system which is used to describe the orientation of both liquid crystal and birefringent compensator optic axes. Light 116 propagates toward the viewer 100 in the positive z direction 102 which, together with the x-axis 104 and the y-axis 106, forms a right-handed coordinate system. The polar tilt angle Θ 108 is defined as the angle between the liquid crystal molecular optic axis (c-axis) 110 and the x-y plane, measured from the x-y plane. The azimuthal angle Φ 112 is measured from the x-axis to the projection 114 of the optic axis onto the x-y plane.

Two types of compensators which are well known are O-plate and A-plate compensators. An O-plate is a birefringent layer with its optic axis, on average, oriented at a substantially oblique angle with respect to the plane of the display. "Substantially obliques" implies an angle appreciably greater than 0° and less than 90°. An A-plate is a birefringent layer with its optic axis oriented parallel to the plane of the display. Additionally, the optic axis of both A-plates and O-plates is aligned, on average, at a certain angle referred to as the azimuthal angle. (see FIG. 1). A compensator's optic axis may be oriented by the use of alignment layers. The use of rubbed polymer films, i.e. alignment direction and tilt angle controlling films, dominates the process technology used in the production of all categories of liquid crystal displays, and polyimides are the most common alignment films in use today. (The alignment of the polymer film itself is induced by gentle buffing or rubbing with specific cloths.)

Unfortunately, polyimides are expensive, and can cause defects when cast onto an already aligned compensator layer. As such, fabrication of compensators often requires the multilayer coating and transferring of films by lamination using pressure sensitive adhesives. This process involves coating a substrate (such as glass) with an alignment layer, then the compensator layer to induce orientation of the compensator's optic axis, and laminating the aligned compensator onto the LCD or compensator stack, thus separating it from the alignment layer. Additional compensators can similarly be added onto the compensator stack by lamination. Since the films to be transferred are thin (e.g. about $1\mu$) and have a large area (e.g. about 43×43 cm), lamination of such films can cause defects such as stress lines. Consequently, fabrication requiring multilayer film transfer lamination is inefficient, labor intensive, and expensive.

A-plates may also be fabricated by the use of uniaxially stretched polymer films, such as polyvinyl alcohol, or other suitably oriented organic birefringent materials. Unfortunately, the quality and uniformity of the optical properties of such prior art A-plates are generally poor. Furthermore, the A-plate must be held under tension and the material must be relatively thick to obtain sufficient anisotropy. The lamination of such A-plates with other retardation films often results in stress-induced birefringence when exposed to elevated temperatures. (see U.S. Pat. No. 5,995,184).

In addition to its use as an alignment layer for compensator films, polyimide is also used as an alignment layer in the liquid crystal cell itself.

SUMMARY OF THE INVENTION

The present invention provides a polyimide-free alignment layer comprising a UV curable epoxy and a reactive liquid crystal material. The polyimide-free alignment layer is inexpensive, and can be used instead of polyimide for fabricating various components of an LCD, including O-plate and A-plate compensators and the liquid crystal cell. The polyimide-free alignment layer is most useful for fabrication of O-plate and A-plate compensators since it can be cast onto an already aligned compensator layer without destroying that layer, thus also acting as a capping layer and allowing for multiple adjacent A-plate and O-plate layers to be fabricated monolithically, without lamination. Additionally, other alignment layers can be cast directly on the polyimide-free alignment layer to provide additional adjustment of the alignment for the compensator layer, again without requiring film transfer lamination. (However, polyimide and film transfer lamination may still be used for other components of the LCD stack, such as C-plate compensators). Eliminating or reducing the need for polyimide and film transfer lamination should significantly reduce material and labor costs, reduce defects due to film transfer lamination and thereby increase production yields, and increase the production rate.

The polyimide-free alignment layer is non-birefringent and transparent, and thus can be as thick as desired without affecting the optical properties of the LCD. Since the polyimide-free alignment layer is adhesive due to its epoxy content, it enhances the mechanical strength of the compensator stack. The polyimide-free alignment layer may also be used instead of polyimide in the liquid crystal cell.

These and other features and advantages of the invention will be apparent to those skilled in the art from the following detailed description, taken together with the accompanying drawings, in which:

BRIEF DESCRIPTION OF THE DRAWINGS

FIG. 2 is a flow chart illustrating a method for preparing a polyimide-free alignment layer.

FIG. 3 is an exploded schematic diagram of an LCD stack including a compensator stack.

DETAILED DESCRIPTION OF THE INVENTION

Figure 1:
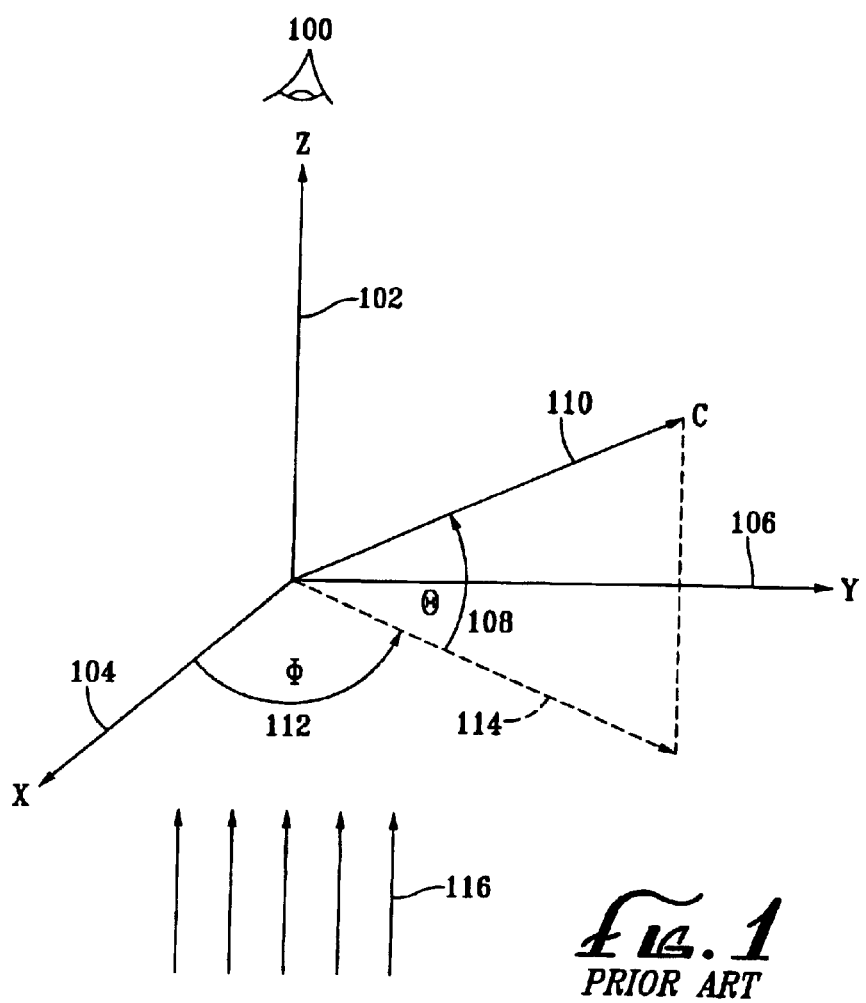
FIG. 1 depicts a three-dimensional coordinate system that is used to specify component orientations in the description of this invention.

The new polyimide-free alignment layer comprises a UV curable optical epoxy and a reactive liquid crystal material, also known as a reactive mesogen ("RM"). Similar to polyimide alignment layers, the new polyimide-free alignment layer can be used for aligning various components of an LCD stack, including the liquid crystal cell and A-plate and O-plate compensator layers. The polyimide-free alignment layer is particularly useful for the fabricating compensator plates of an LCD stack, since it can be cast onto an already aligned compensator layer without destroying that layer, whereas polyimide cannot be cast onto an aligned layer without destroying it. As such, the polyimide-free alignment layer acts as a capping layer when cast onto an already aligned layer, allowing for direct fabrication of a second layer on top of it, without requiring lamination of the layers.

FIG. 2 is a flow chart illustrating a method for preparing the polyimide-free alignment layer, comprising the steps of: a) dissolving a mixture comprising an epoxy and a RM in a solvent to form an epoxy/RM mixture (step 200); b) coating a substrate with the epoxy/RM mixture to form an alignment layer on the substrate (step 202); c) removing the solvent from the layer and photo-polymerizing the layer (step 204); and d) creating a desired alignment of the molecules in the layer (step 206).

The layer can be coated onto an existing layer in the LCD stack, including the substrate encasing the liquid crystal cell, or an already formed compensator layer. Additionally, the layer can be coated onto a substrate outside of the LCD (e.g. ITO glass or a plastic substrate), for fabricating a stack of compensator layers which can be subsequently adhered to the LCD (e.g. by hot pressing or gelling with Silicone Gel).

The composition ratio of the epoxy and reactive mesogen is chosen such that the cured film will be isotropic and the liquid crystals in the film are able to be aligned after rubbing. The epoxy helps to form an isotropic network in which the liquid crystal molecules of the RM are oriented randomly. Too much epoxy can prevent the molecules from achieving a uniform alignment after rubbing, and result in reverse tilt domains or Schlieren texture defects. It is estimated that the mixture can have anywhere from about 10% to about 80% by weight of epoxy. However, the exact amount will depend on the type of RM and epoxy used. The epoxy and RM are dissolved in a suitable solvent to form an epoxy/RM mixture. Additionally, a photo-initiator is added (generally between 1% and 5% in weight composition), and a small amount of a thermal-inhibitor may optionally be added to suppress unwanted polymerization and increase the shelf life of the mixture.

The RM can be any type of reactive crystal material including oligomers or monomers which are monoacrylate or diacrylate. Many types of RMs are commercially available through suppliers such as Merck. The ingredients are mixed and dissolved, preferably in a ketone solvent such as cyclohexanone or MEK/Acetone/cyclopentanone, or toluene or chlorobenzene. The solvent has to be carefully chosen such that it can dissolve a substantial amount of RM and not destroy the alignment of the layer beneath it. Of the above listed solvents, chlorobenzene is the least preferred because it is more likely to attack the alignment of a layer beneath it.

Once the ingredients are dissolved, they are coated on the substrate by a conventional coating method (e.g. spin coating, meniscus coating, web coating) to form a layer. For small scale operation meniscus coating; is preferred because it produces better uniformity. However, for a large scale process, web coating is preferred. The layer can range between a sub-micron to tens of microns thickness. The layer's thickness will not affect the optical properties of the LCD stack, since it is transparent and non birefringent. Additionally, a greater thickness enhances the mechanical strength of the compensator stack.

The layer is dried at an elevated temperature to evaporate the solvent. The temperature and drying time depend on the solvent used. However, drying too fast or using a temperature that is too high can cause undesired convection patterns in the layer.

After drying, the layer is UV cured to polymerize the liquid crystal molecules. Since $O_2$ can consume free radicals which are needed for the cross linking reactions required for polymerization, UV curing is preferably conducted in an $N_2$ environment. A typical UV curing machine has a UV chamber filled with $N_2$ gas.

Once the layer is UV cured, the molecules in the layer are aligned, according to the alignment desired for the compensator layer. In A-plate and O-plate compensators, the polar tilt angle and azimuthal angle are the two components that determine the orientation of the optic axes (see FIG. 1).

The azimuthal angle of the polyimide-free alignment layer can be oriented by rubbing the layer with a suitable cloth, similar to the rubbing process for aligning polyimide films.

According to one method, the polyimide-free alignment layer is rubbed using a cylindrical roller having a rubbing cloth such as cotton, or a synthetic fabric such as rayon. The roller is pressed down into the polyimide-free alignment layer, and rotated in a uniform direction. The actual tilt angle obtained is a function of polymer ordering on the surface, the resulting surface energy, the nature of the cloth used to buff the surface, the speed and distance of the roller on the coated surface, and the amount of buffing work. After rubbing the polyimide-free alignment layer is rinsed with an alcohol such as isopropanol to remove rubbing particles left on its surface. As mentioned above, in an A-plate compensator the tilt angle is 0°, while in an O-plate compensator the tilt angle is oblique (i.e. between 0° and 90°). The polyimide-free alignment layer itself has an inherent oblique tilt angle (in the order of 1° with the materials currently produced). However, in most cases this angle will be too small for O-plates.

According to one embodiment for fabricating A-plates, the optic axis in an A-plate can be made parallel to the plane of the display by including an additive, such as a surfactant, with the RM in the A-plate layer (see U.S. Pat. No. 5,995,184), to lower its intrinsic tilt angle. The mixture forming the layer ("A-plate mixture") also preferably includes a photo-initiator, and may include a thermal inhibitor to increase its shelf life. As with the alignment layer, the ingredients are preferably dissolved in a suitable solvent such as a ketone solvent. The A-plate mixture is coated onto the alignment layer by a conventional coating method (e.g. spin coating). While the thickness of the alignment layer has a wide range, the thickness of the A-plate layer (and O-plate layer discussed below) is limited depending on the birefringence of the material used, since the thickness of these layers affects optical performance of the LCD. The A-plate layer is then dried and UV cured, preferably in an $N_2$ environment, similar to the method for preparing the polyimide-free alignment layer. As such, an A-plate compensator can be fabricated by casting the A-plate mixture directly onto of the polyimide-free alignment layer, without additional alignment layers or lamination.

According to one embodiment for fabricating O-plate compensators, the optic axis tilt angle may be adjusted by using a high pretilt layer (HPL), which can be cast directly on the polyimide-free alignment layer, without lamination. The HPL has a gradually increasing tilt which is low at the surface adjacent to the alignment layer (called the solid surface tilt) and increases to a high tilt at the opposite surface (called the nematic air tilt). Thus, at the nematic air interface, the alignment will have a high tilt with an azimuthal orientation according to the alignment layer below it.

According to one embodiment, the mixture forming the HPL ("HPL mixture") includes a reactive mesogen, a photo-initiator, cyclohexanemethylacrylate (CHM) to eliminate or reduce reverse tilt defects, and a thermal-inhibitor to increase its shelf life. As with the A-plate and alignment layers, the ingredients are preferably dissolved in a suitable solvent such as a ketone solvent. The HPL is coated onto the alignment layer by a conventional coating method. The thickness of the HPL is preferably between 0.1 to 0.25 $\mu$, since a thickness greater than 0.25$\mu$ would compromise optical performance, while a thickness much less than 0.1$\mu$ would affect the nematic air tilt. After coating, the HPL layer is dried and UV cured, preferably in an $N_2$ environment, similar to the preparation of the A-plate and alignment layer. Thereafter, a RM layer can be cast on top of the HPL layer to fabricate an O-plate, oriented according to the alignment of the HPL.

According to one embodiment, the mixture forming the O-Plate ("O-plate mixture") includes a reactive mesogen, a photo-initiator, and a thermal inhibitor to increase the shelf life. As with the other layers, the ingredients are dissolved in a suitable solvent such as a ketone type solvent. The O-plate mixture is coated onto the HPL by a convention coating method. As with the A-plate, the O-plate thickness is limited, depending on the birefringence of the material. The O-plate layer is then dried and UV cured, preferably in an $N_2$ environment, similar to the preparation of the other layers.

It is also believed that the polyimide-free alignment layer may be oriented by photo-alignment. (See U.S. Pat. No. 6,191,836). This method involves UV curing the layer with polarized UV light to orderly align the molecules in the layer. Such a technique would result in a one step process for aligning the layer without rubbing, and without the use of a surfactant for an A-plate, or an additional HPL layer for an O-plate.

EXAMPLE

Fabrication of an LCD for Flight Display Applications Using a Polyimide-free Alignment Layer FIG. 3 is a schematic diagram of an LCD stack 300 used for flight display applications comprising a front polarizer 302, a C-plate 304 behind the polarizer 302, a liquid crystal cell 306 behind the C-plate 304, an A-plate 308 behind the liquid crystal cell 306, first and second O-plates 310, 312 behind the A-plate 308, and a back polarizer 314 behind the O-plate 312. (see Taber, Gray Scale and Contrast Compensator For LCDs Using obliquely Oriented Anisotropic Network", SPIE, Vol. 3363, page 164). The LCD is viewed through the first polarizer as illustrated in the figure.

The exact thicknesses and orientations of the layers can vary; the parameters chosen for the purpose of this illustration are listed in table 1:

TABLE 1

| Parameters for a flight display LCD | |
|---|---|
| front polarizer | Polarization axis at 143° |
| C-plate | thickness × birefringence = −70 nm |
| liquid crystal | Sharp 8 × 8 LCD, SLN1 LC |
| A-plate | thickness × birefringence = 140 nm, thickness = 0.9$\mu$, 43° azimuthal alignment |
| first O-plate | thickness = 0.95$\mu$, 320° azimuthal alignment, 40° polar tilt |
| second O-plate | thickness = 1.1$\mu$, 235° azimuthal alignment, 40° polar tilt |
| back polarizer | Polarization axis at 52° |

To illustrate LCD fabrication using a polyimide-free alignment layer as described above, this example will focus on fabricating the portion of the stack comprising the A-plate 308 and O-plates 310, 312 (referred to as the "compensator stack"). The liquid crystal cell 306, C-plate 304, front polarizer 302, and back polarizer 314 may be purchased commercially through suppliers such as Sharp. The compensator stack can be combined with the other LCD components by conventional methods such as gelling and hot pressing. The stack can also be fabricated directly on the surface of the liquid crystal cell.

Figure 4:
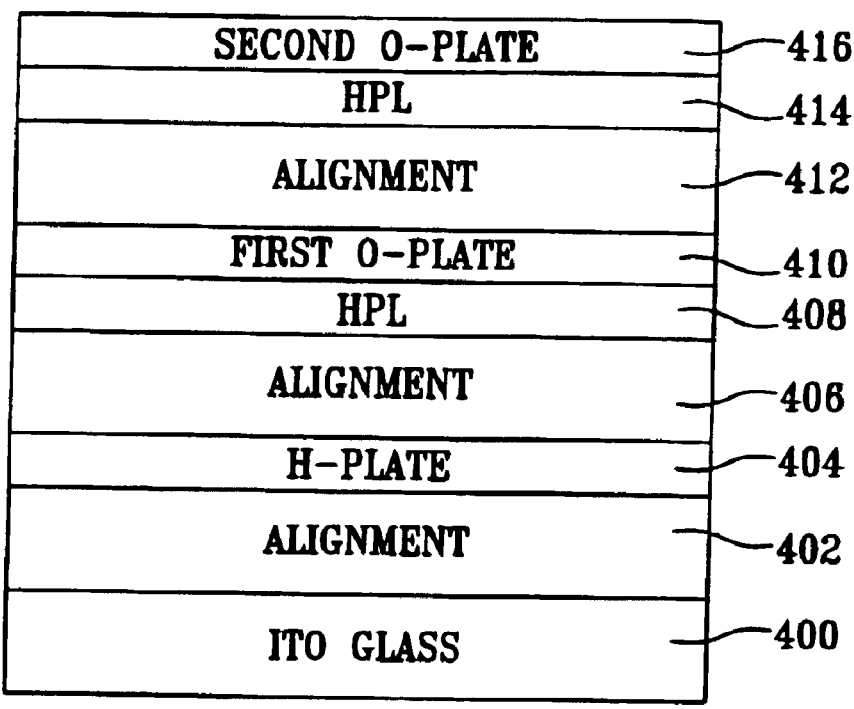
FIG. 4 is a schematic diagram of the compensator stack illustrate in FIG. 3, including alignment layers in accordance with the invention.

FIG. 4 is a schematic diagram of the compensator stack, including the alignment layers, fabricated according to one embodiment wherein the polyimide-free alignment layers are oriented by rubbing. The compensator stack was fabricated on an ITO glass substrate 400. The layers coated on the substrate 400 were a first polyimide-free alignment layer 402, a RM ("A-plate") layer 404 on the alignment layer 402, a second polyimide-free alignment layer 406 on the A-plate layer 404, a first HPL layer 408 on the second polyimide-free alignment layer 466, a RM ("first O-plate") layer 410 on the HPL layer 408, a third polyimide-free alignment layer 412 on the O-plate layer 410, a second HPL layer 414 on the polyimide-free alignment layer 412, and a RM ("second O-plate") layer 416 on the HPL layer 414.

The alignment layer 402 was prepared by dissolving 2.5 grams (g) of UV curing epoxy (NOA 68, Norland), 7.5 g of reactive mesogen (RM257, Merck), 0.075 g of photo-initiator (Irgacure 651, Merck), and 0.0075 g of thermal inhibitor (4-ethoxyphenol, Aldridge) in 90 g of cyclohexanone. The mixture was spin coated onto the substrate 400 at a speed of 2600 rpm for 20 seconds. The layer was dried at a temperature of 85° C. for 90 seconds, and UV cured in an $N_2$ environment at a temperature of 85° C. for 150 seconds. The layer was then aligned by rubbing using a cotton roller with a diameter of approximately 11.4 cm, at a speed of 500 rpm, in a counterclockwise direction, and pressed down on the layer's surface, compressing the roller 0.5 mm. The layer was fed into the roller at a speed of about 1 cm/sec at 43°. The layer was then rinsed with isopropanol to remove any rubbing debris. The resulting alignment layer had a thickness of $0.2\mu$, an azimuthal alignment of 43° (see FIG. 1), and a polar tilt of about 1°.

The A-plate layer 404 was prepared by dissolving 25 g of reactive mesogen (RM257, Merck), 0.0875 g of surfactant (PCHM (M.W. 20,000), Scientific Products), 0.25 g of photo-initiator (Irgacure 651, Merck), and 0.025 g of thermal inhibitor (4-ethoxyphenol, Aldridge) in 75 g of cyclohexanone. The mixture was then spin coated onto the alignment layer 402 at a speed of 1750 rpm for 8 seconds. The layer was dried at a temperature of 85° C. for 120 seconds, and UV cured in an $N_2$ environment at a temperature of 85° C. for 150 seconds. The resulting layer had an azimuthal alignment of 43°, a polar tilt of 0°, and a thickness of $0.9\mu$. The (birefringence)×(thickness) product for the layer was 140 nm.

The second alignment layer 406 was prepared and coated on the A-plate layer 404 in the same way as the first alignment layer. The layer 406 was aligned to an azimuthal angle of 320° by rubbing with a 11.4 cm inch diameter, cotton roller at a speed of 500 rpm, in a counter clockwise clockwise direction, and pressed down on the layer's surface, compressing the roller 0.5 mm, as with the first alignment layer. The layer was fed into the roller at a speed of about 1 cm/sec at 320°. The resulting alignment layer had a thickness of $0.2\mu$.

The first HPL layer 408 was prepared by dissolving 10 g of reactive mesogen (RM257, Merck), 0.1 g of photo-initiator (Irgacure 651, Merck), 2 g of CHM, Aldridge, and 0.001 g of thermal inhibitor (4-ethoxyphenol, Aldridge) in 90 g of cyclohexanone. The mixture was spin coated onto the alignment layer 406 at a speed of 2600 rpm for 8 seconds. The layer was dried at a temperature of 85° C. for 90 seconds, and UV cured in an $N_2$ environment at a temperature of 85° C. for 150 seconds. The resulting layer had a nematic air tilt of about 40° and a thickness of $0.15\mu$.

The first O-plate layer 410 was prepared by dissolving 25 g of reactive mesogen (RM257, Merck), 0.25 g of photo-initiator (Irgacure 651, Merck), and 0.025 g of thermal inhibitor (4-ethoxyphenol, Aldridge) in 75 g of cyclohexanone. The mixture was spin coated onto the HPL 408 at a speed of 1750 rpm for 8 seconds. The resulting layer was dried at a temperature of 85° C. for 120 seconds, and UV cured in an $N_2$ environment at a temperature of 85° C. for 150 seconds. The resulting layer had an azimuthal alignment of 320°, a polar tilt of 40°, and a thickness of $0.95\mu$.

The third alignment layer 412 was prepared and coated on the O-plate layer 410, in the same way as the first alignment layer. The layer 412 was aligned to an azimuthal angle of 235° by rubbing as with the first two layers, and feeding the layer into the surface at 235°. The resulting alignment layer had a thickness of $0.2\mu$.

The second HPL layer 414 was prepared and coated onto the third alignment layer 412 in the same way as the first HPL layer 408. It had a nematic air tilt of approximately 40° and a thickness of $0.15\mu$ as with the first HPL layer.

The second O-plate 416 was prepared and coated onto the second HPL layer 414 in the same way as the first O-plate 410, except the spin coating was done at a speed of 1720 rmp instead of 1750 rpm to produce an O-plate having a thickness of $1.1\mu$. The resulting layer had an azimuthal alignment of 235°, and a polar tilt of 40°.

Figure 5:
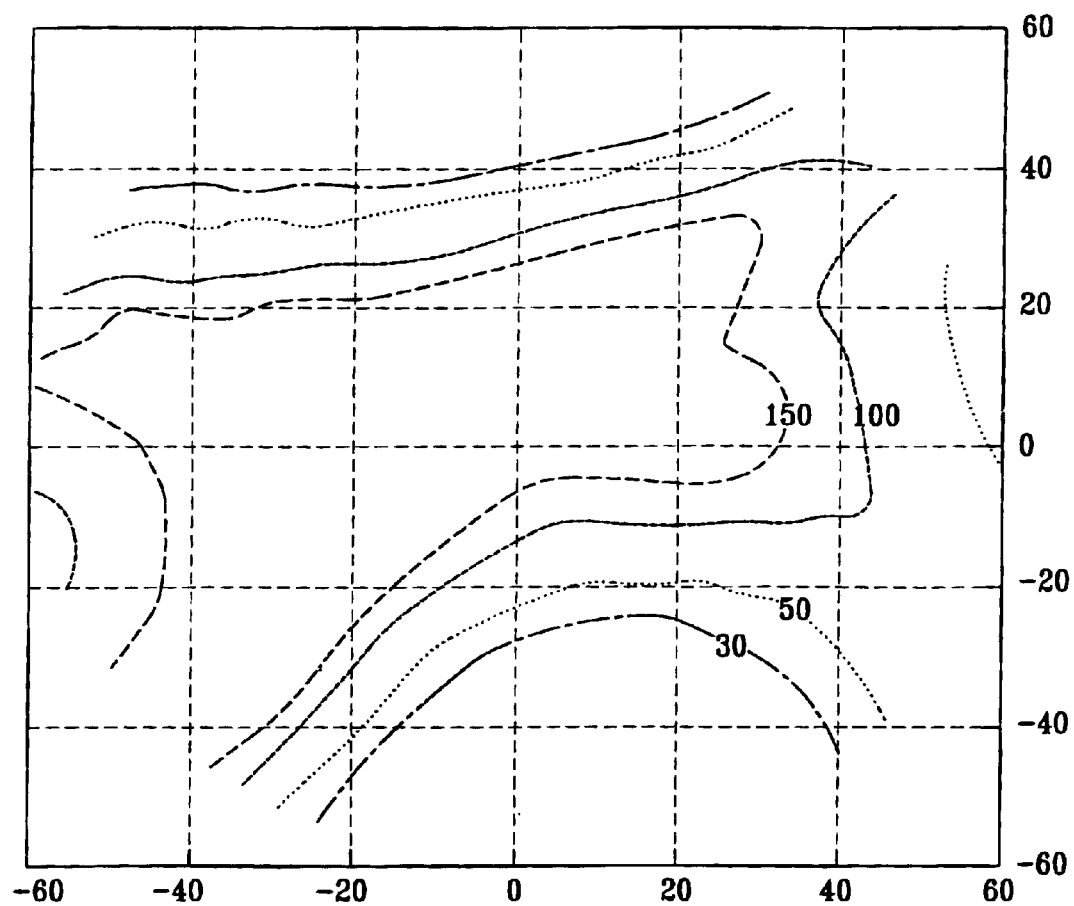
FIG. 5 is a plot of the brightness to darkness ratio versus position on an LCD, fabricated in accordance with the invention.

FIG. 5 is a plot of the isocontrast ratio of the display, achieved with a monolithically fabricated LCD using the polyimide free alignment layer, according to the above example. The normal direction of the display panel is indicated by the (0,0) coordinates for the X (horizontal) and y (vertical) axes. Isopleths indicating brightness to darkness ratios of 150, 100, 50, and 30 are indicated in the figure. The measurements shown were taken using a voltage of 4.6V, and without a green filter. As can be seen, the brightness to darkness ratio is fairly high, even at large viewing angles on the figure.

As will be apparent to one skilled in the art, the new polyimide-free alignment layer can be used for fabricating numerous other types of LCDS, which may include any type of liquid crystal cell, and a variety of compensator layers (i.e. A-plates, C-plates, and O-plates) which can assume many different orientations in the LCD.

Figure 6:
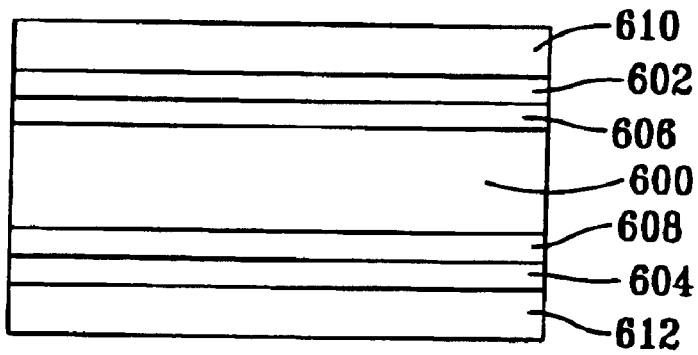
FIG. 6 is a cross sectional view of a liquid crystal cell in accordance with the present invention.

Additionally, the liquid crystal cell as illustrated in FIG. 6 may be fabricated using a polyimide free alignment layer as described above instead of polyimide. Briefly, the liquid crystal cell comprises a liquid crystal layer 600 with opposite sides, a set of electrodes 602, 604 on opposite sides of the liquid crystal layer 600 and alignment layers 606, 608 respectively between each set of electrodes 602, 604 and the liquid crystal layer 600. The electrodes bearing the alignment layers are supported by respective substrates 610, 612 that are transparent to the wavelength of interest, typically glass or plastic. Alignment of the liquid crystal molecules occurs at a certain angle with respect to the plane of the inside of the two electrode supporting substrates. (See U.S. Pat. No. 6,139,926). Replacing the conventional polyimide alignment layer with the new polyimide-free alignment layer would result in lower production costs, since the new layer is less expensive.

An LCD fabricated using the polyimide-free alignment layer according the embodiments described above may be incorporated into many types of operating systems, including but not limited to: Global Positioning Satellite (GPS) receiver units; computers including the laptop and notepad units; personal digital assistants; calculators; personal calendars; cellular telephones; watches and clocks; automobile, aircraft, and boat displays.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

What is claimed is:

1. An alignment layer for a liquid crystal display, comprising a cured isotropic transparent and non-birefringent polymer film formed from a mixture of:

a curable epoxy and a reactive mesogen the cured mixture of said epoxy and reactive mesogen constituting an isotropic transparent and non-birefringent polymer film comprising polymerized liquid crystal molecules randomly oriented in cured epoxy, said polymerized liquid crystal molecules at an exposed surface of the isotropic transparent and non-birefringent polymer film capable of being subsequently aligned.

2. The alignment layer of claim 1, wherein said composition is polyimide free.

3. The alignment layer of claim 1, wherein the epoxy is UV curable.

4. The alignment layer of claim 1, further comprising a photo-initiator mixed with said epoxy.

5. The alignment layer of claim 4, further comprising a thermal-inhibitor mixed with said epoxy, reactive mesogen and photo-initiator.

6. The alignment layer of claim 1, wherein said epoxy comprises between 10% and 80% by weight of said isotropic alignment layer.

7. The alignment layer of claim 1 wherein the randomly oriented liquid crystals in the cured film are capable of being azimuthally oriented by rubbing the film.

8. The alignment layer of claim 1 wherein the reactive mesogen is a UV curable monoacrylate or diacrylate monomer or oligomer.

9. The alignment layer of claim 1 wherein the cured polymer film is formed from the curable epoxy and reactive mesogen dissolved in a solvent which does not damage other layers of the liquid crystal device upon which it is coated.

10. The alignment layer of claim 9 wherein the solvent is a ketone.

11. The alignment layer of claim 9 wherein the solvent is chosen from the group consisting of cyclohexanone, methylethylketone, acetone, cyclopentanone, toluene and chlorobenzene.

* * * * *